United States Patent [19]

Currat

[11] Patent Number: 5,363,026
[45] Date of Patent: Nov. 8, 1994

[54] METHOD OF OPERATING A NUMERICALLY CONTROLLED MACHINE TOOL AND A MACHINE TOOL FOR CARRYING OUT THE METHOD

[76] Inventor: Jacques Currat, 44 Condemine, Moutier, Switzerland, 2740

[21] Appl. No.: 203,854

[22] Filed: Feb. 25, 1994

Related U.S. Application Data

[63] Continuation of Ser. No. 973,890, Nov. 10, 1992, abandoned.

[30] Foreign Application Priority Data

Nov. 16, 1991 [DE] Germany .............................. 91119587

[51] Int. Cl.$^5$ .......................................... G05B 19/403
[52] U.S. Cl. .................................. 318/569; 318/571; 318/573; 364/474.28
[58] Field of Search .................. 318/560–646; 364/474.01–474.38; 395/80–90; 901/1, 3, 5, 7, 9, 12, 13, 15, 17, 19–23; 414/730–735

[56] References Cited

U.S. PATENT DOCUMENTS

| | | |
|---|---|---|
| 3,557,350 | 1/1971 | Proctor .............................. 318/18 X |
| 3,585,372 | 6/1971 | Bell ................................... 318/28 X |
| 3,626,385 | 12/1971 | Bouman . |
| 3,636,525 | 1/1972 | Inaba et al. ...................... 340/172.5 |
| 3,864,557 | 2/1975 | Sindler ............................. 318/571 X |
| 3,878,372 | 4/1975 | Sindler ............................. 318/571 X |
| 4,257,000 | 3/1981 | Friberg ............................. 318/573 X |
| 4,262,336 | 4/1981 | Pritchard ........................ 318/573 X |
| 4,712,052 | 12/1987 | Omae et al. ........................... 318/625 |
| 4,787,049 | 11/1988 | Hirata et al. .................... 318/561 X |
| 4,931,709 | 6/1990 | Ikeda et al. ......................... 318/567 |
| 5,051,913 | 9/1991 | Kume et al. ................... 364/474.28 |
| 5,084,826 | 1/1992 | Hariki et al. ........................... 395/83 |
| 5,086,262 | 2/1992 | Hariki et al. ...................... 318/568.1 |

*Primary Examiner*—Paul Ip
*Attorney, Agent, or Firm*—Keck, Mahin & Cate

[57] ABSTRACT

In a method of operating a numerically controlled machine tool having tools for processing workpieces, the paths to be calculated for the movements of axes of the tools are not calculated in real time on the processing of a workpiece, but are calculated previously by a programming unit before the processing of the workpiece, and are stored by a compiler into an object file for each axis the movement of which is to be controlled. All the object files run in synchronism on the processing of the workpiece under the timing of a central clock.

6 Claims, 8 Drawing Sheets

METHOD OF OPERATING A NUMERICALLY CONTROLLED MACHINE TOOL AND A MACHINE TOOL FOR CARRYING OUT THE METHOD

This is a continuation of application Ser. No. 07/973,890, filed Nov. 10. 1992, abandoned.

BACKGROUND OF THE INVENTION

This invention relates to a method of operating a numerically controlled machine tool having tools for processing workpieces, the tools having a plurality of axis and spindle movements which are to be calculated independently of each other to control the tools, the operation of the machine tool being controlled by further operating, auxiliary and control commands. The invention also relates to a machine tool for carrying out the method.

In known methods of operating such machine tools it is usual to use a central machine program, from which the individual tool axes are controlled. Accordingly the corresponding program set is loaded into a core memory, interpreted and carried out. Such a method is, however, relatively complicated and time-consuming, because a new calculation must be carried out at each program step. A conventional program set consists, for example, of a direction that the X-axis and the Y-axis of a tool are to be advanced to a particular extent and the speed along the path of advance is included in the program set. In such a program set, which is loaded into the memory at each step, the way in which the processing is to be executed is also included, that is to say, for example, by drilling, milling or turning.

With each program set, however, the X, Y and, if applicable, also the Z-axis of the tool concerned, and also the other variables, must be recalculated each time. Also, corresponding signals must be returned to the control unit to announce thereto that the corresponding program step has been completed, or alternatively, that errors have occurred, for example tool path deviations, which must be corrected. The execution of such a program step is, therefore, costly and complicated.

Also, the carrying out of such different program steps involves an undesirably large expenditure on hardware and software.

SUMMARY OF THE INVENTION

The present invention is therefore directed to the simpler and more economical control of a machine tool of the kind discussed above.

The present invention provides a method of operating a numerically controlled machine tool for processing workpieces with a plurality of axis and spindle movements, which are to be calculated independently of each other, to control the tools, and also with further operating, auxiliary and control commands, controlling the operation of the machine tool, wherein the paths which are to be calculated for all axis controls are not calculated in real time on the manufacture of the workpiece, but rather are calculated previously by a programming unit before the manufacture of the workpiece and are stored by a compiler in each case into an object file for each axis which is to be controlled, and that all object files run in synchronism on the manufacture of the workpiece under timing by a central clock.

Accordingly, the individual program steps mentioned above are not calculated in the machine tool itself, but rather in an external host computer before a workpiece is processed. The host computer may supply tables, that is to say tabular format data, as a function of the different program steps. The tables are correlation tables, in which a time sequence is given for each tool axis, for example the time t1, t2, t3, t4 and t5, and as a function of these time steps, the required positions of the X- and Y-axis and, if applicable, Z-axis, of the tool at this point in time are calculated and stored in object files for each individual tool axis which is to be controlled.

The tool axes to be controlled need not be only the tool axes X, Y and Z, since a machine tool has further axes. For example, there are several X- and several Y-axes and there are further axes beyond the X, Y and Z-axes, for example the axis of a self-contained rotating spindle, which is controlled separately. Any axis of the machine tool may therefore be controlled by the application of the invention.

By virtue of the present invention, a relatively costly intelligent machine tool is dispensed with and, instead, the data calculated by such a machine tool are calculated by the host computer, which stores the data in a desired digital form for the machine tool or indeed for a plurality of machine tools. The task of calculating the data is thus transferred from the machine tool or tools to the host computer.

The teaching of the present invention is analogous to the known principle of machine tool control, mechanically by means of cam discs which are scanned mechanically during the finishing. Also, in such cam disc controlled machine tools, the paths of the tool axes are calculated in advance and are stored (namely in the form of the cam discs) and the starting (scanning) of the cam discs is effected in synchronism, all the cam discs being driven by a single control shaft.

In principle, according to the teaching of the invention, "cam discs" for each tool axis are stored separately in numerical form and are not scanned, that is to say turned by a central control shaft, but are finished by means of a central time clock cycle.

The advantages of mechanical control, namely speed of execution and simplicity of application, are, therefore, combined with those of numerical control, namely flexibility, the possibility of incorporation into a complex CIM.

The command structure which is preset in numerical form, should satisfy the following conditions:
it should be capable of controlling a machine tool having many spindles,
the various axes should be controlled in total synchronism,
it should be possible to synchronise the movements of an axis or of a group of axes with one spindle, and
the movements of the axes should be able to be carried out at a desired speed forwards or in reverse.

In contrast to the conventional numerical control of machine tools, no paths of axes, auxiliary and monitoring functions of the program are calculated in real time, according to the teaching of the present invention. Instead, paths calculated for all of the axes before the actual processing of a workpiece are fed into a central computer, which then controls individual axis charts that is to say structural units for each axis which is to be controlled, and performs the respective axis program, under the control of the central clock.

Provision may also be made for the remaining machine control commands that is to say operating commands, in particular the auxiliary and monitoring functions of the machine, likewise to be calculated and fed to a memory-programmable control, which controls the various auxiliary and monitoring functions of the machine tool as a function of the central clock cycle.

An advantage of the teaching of the present invention is that the synchronisation of the different axis movements is brought about through the central clock cycle, which is analogous to the central control shaft of a mechanically scanned cam disc control arrangement. Likewise, the synchronisation of the relative movements to a rotating spindle, for example for thread cutting, is brought about by another clock cycle, which is synchronised through the rotation of the spindle.

In order to process the programs for the separate control of each axis, the axis movements may be defined by a standard workpiece program in ISO code. An interpolator or compiler, which is equipped with some additional functions, calculates the course of the path, that is to say the speed-time, of each axis and writes the values into an object file for each axis. According to one embodiment the function of the interpolator or compiler is arranged in the programming unit. According to another embodiment, the interpolator or compiler is arranged in the central control unit. According to a further embodiment, the interpolator or compiler is arranged in structural unit charts associated with the individual axes which are to be controlled.

A table is, therefore, produced for each tool axis which is to be controlled, or for each spindle which is to be controlled, the table steps of which are finished as a function of time. Provision is, therefore, made that a particular tool axis performs a given course of advance per time cycle.

Alternatively, instead of the length of advance of an axis, the advance time thereof may also be indicated, because these two amounts are directly linked with each other.

Since the table should not only be finished from top to bottom, but also from bottom to top, an established system cycle should not only be present, but should be alterable.

The speed of advance is, therefore, the number of cycles which are waited, in order for an axis to travel a particular increment of its advance. These increments are always identical. For example, an allocation may be made such that an advance length of 1 micrometer is associated with one system cycle. Here, provision may then be made that, if one receives two cycles, one receives 2 micrometers advance accordingly.

Alternatively, however, the speed of advance may be slowed down and so established that only after the appearance of two system cycles is a single increment carried out. In this case, the timing of the various axes is not constant, but is variable within broad limits.

A machine tool according to the invention reproduces or performs parameters of a cam control in the ratio 1:1. The control of the machine tool, therefore, only knows one allocation of a particular system cycle to a particular path of the corresponding tool axis. The machine tool does, therefore, require no man-machine interface, that is to say no display and no terminal, so that the manufacturing costs of the machine tool are reduced substantially. It is sufficient therefore to associate with the machine a simple display, for example of light emitting diodes or corresponding numerical displays, and costly input devices and output devices are not, therefore, needed.

DETAILED DESCRIPTION OF PREFERRED EMBODIMENTS OF THE INVENTION

Figure 1:
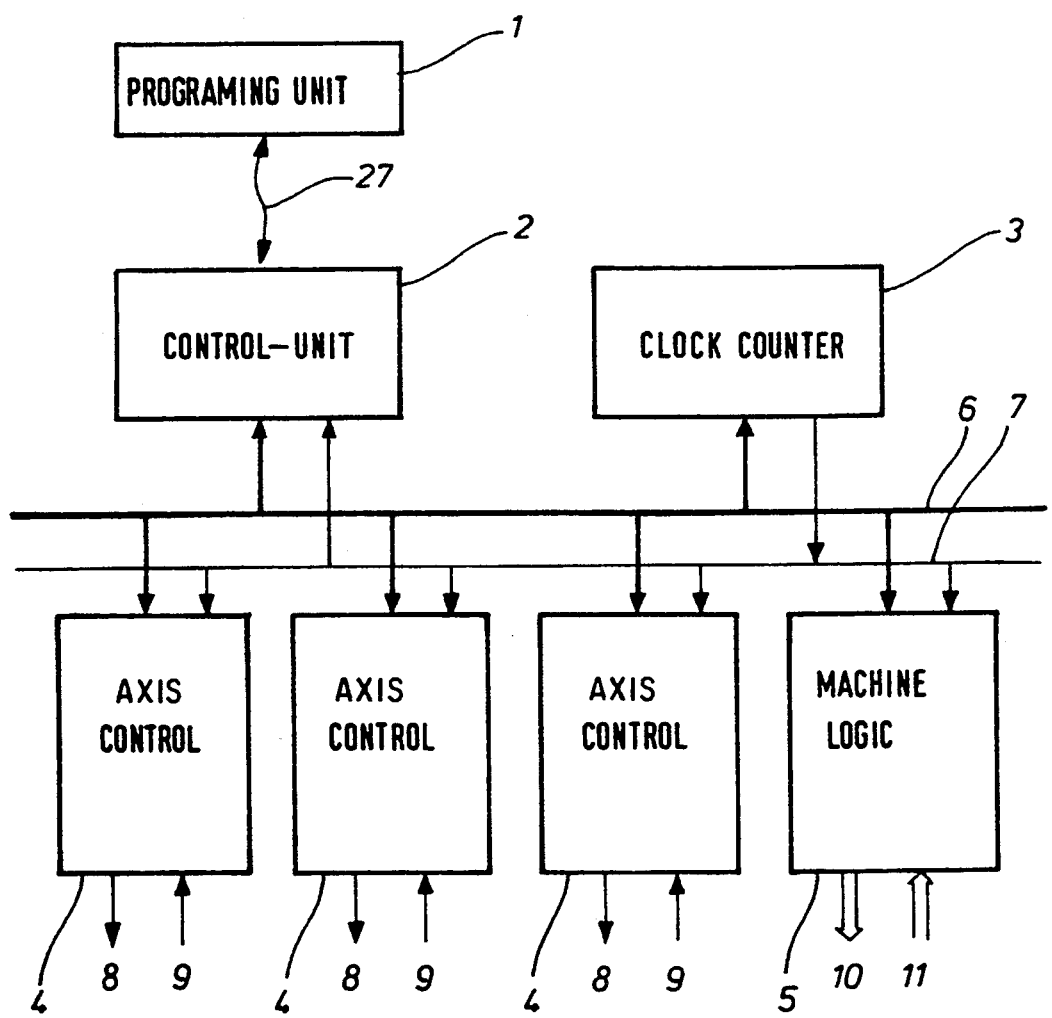
FIG. 1 is a simplified block schematic diagram of a control system according to an embodiment of the invention for a machine tool having a plurality of tools for processing workpieces.

FIG. 1 shows in simplified form a control system for a numerically controlled machine tool having a plurality of tools for processing workpieces. An external programming unit 1 contains software programs for the workpieces. This host computer or programming unit 1 (13 in FIGS. 3 and 4) may supply a plurality of machine tools with corresponding control commands. Each software program is passed from the unit 1 to a computer in the form of a central control unit 2 by way of a connecting line 27. The central control unit 2 is described below in more detail with reference to FIG. 2.

The commands of the software of the programming unit 1 are converted into tabular form, so that different object programs 24 (FIG. 2) are produced for each of tool axis controls 4 (FIG. 1). The object programs 24 are fed by way of a bus 6 into the individual axis controls 4. Finishing of the individual object programs 24 is then effected separately for each axis control 1,2–N as a function of a central time cycle 3, so that entirely synchronous finishing of all of the software commands is achieved in respect of the directions 1,2–N of movement of the axes. The time cycle 3 is fed to all axis controls 4 by way of a bus 7.

Likewise, the control unit 2 acts by way of the bus 6 on a machine logic unit 5, which is preferably a memory-programmable control. The machine logic unit 5 serves to produce auxiliary and monitoring functions in the machine tool. Therefore, the individual auxiliary functions of the machine tool are controlled by way of an output bus 10, and the answer-back of the machine function to the machine logic unit 5 is effected by way of an input bus 11.

Analogously, each axis control 4 controls by way of its outlet 8 a corresponding motor of the machine tool, for producing tool axis advance movement, and receives the corresponding answer-back from the axis motor, so controlled, by way of the inlet 9 of the axis control 4.

The construction of an axis control 4 according to FIG. 1 will now be described in further detail with reference to FIG. 2.

As explained above, the control unit 2 (or 12 in FIG. 3) contains tabular object programs 24, in which there is associated with each axis control 4 an individual, separate object program, as explained in more detail below with reference to FIG. 8.

Each object program 24 essentially consists of a table, in which there is associated with each axis velocity V a path or advance length L for the tool axis to be controlled. A position monitoring unit 21 of the object program 24 is under the control of an upward and downward counter 20. The counter 20 times the position monitoring unit 21 which processes, in stages according to the time cycle 3, the stored table of the object program 24. A machine position unit 22 thereby produces a calculated machine position value at a specific point in time. There is calculated from said calculated value of the machine position a further value in a program position unit 25, in the calculation of which further value various tool displacements measured by a tool shift measurement unit 23 (zero point, tool) are included.

A regulator 26 compares the deviation between the program position calculated by the unit 25 and the actual axis position measured by the unit 23 and thus produces a corresponding control signal on the outlet 8 of the axis control 4. The axis control 4 receives the actual axis position by way of its inlet 9.

It may be said in summary that according to the simple principle of axis control described above with reference to FIG. 2, an object program 24, in the form of a table, controls the advance of the spindle axis under the action of time cycle 3.

It will now be explained with reference to FIGS. 3 and 4, how said simple principle of FIG. 2 can be applied to the control of several axes operating independently of each other.

Figure 3:
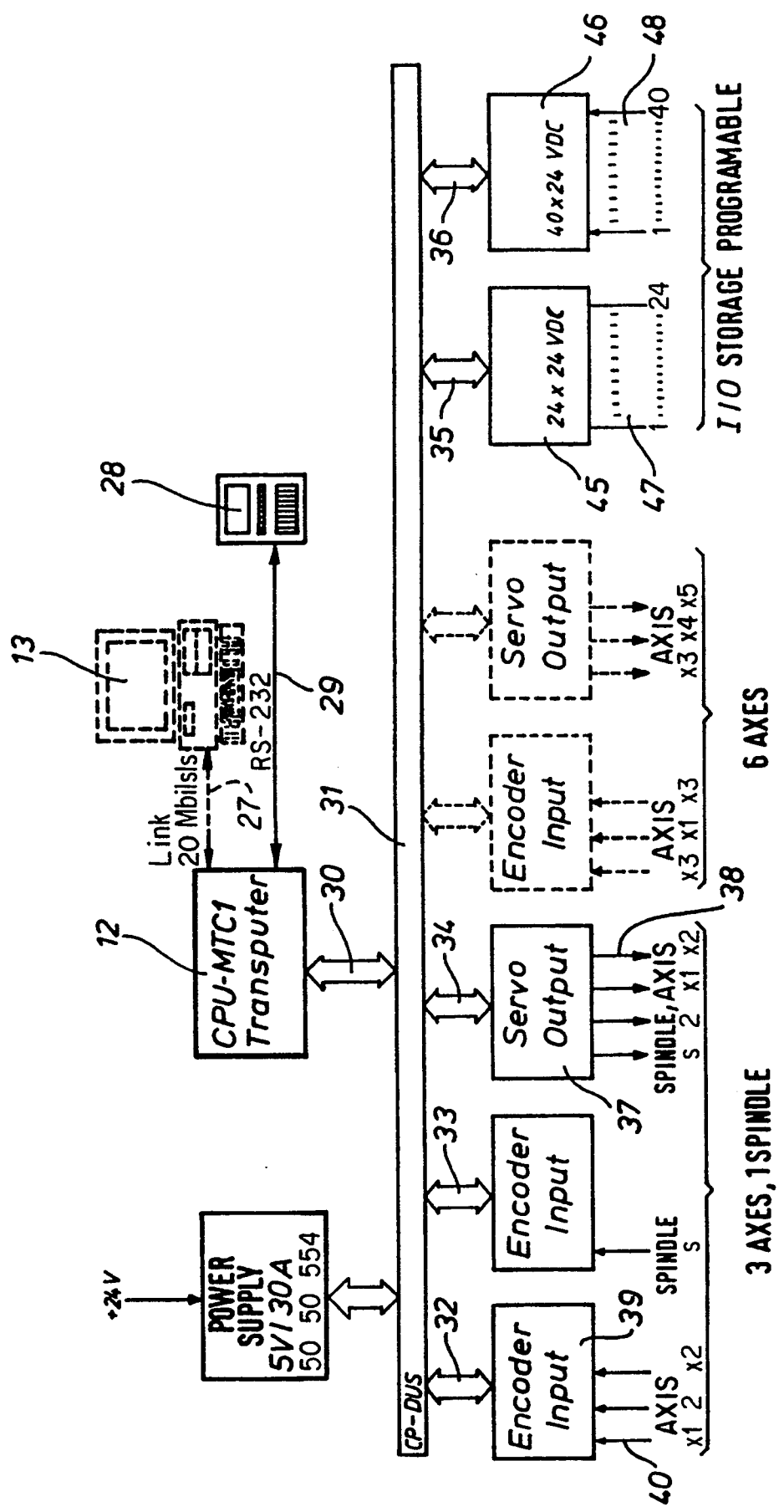
FIG. 3 is an expanded block schematic diagram of the control system of FIG. 1.
Figure 4:
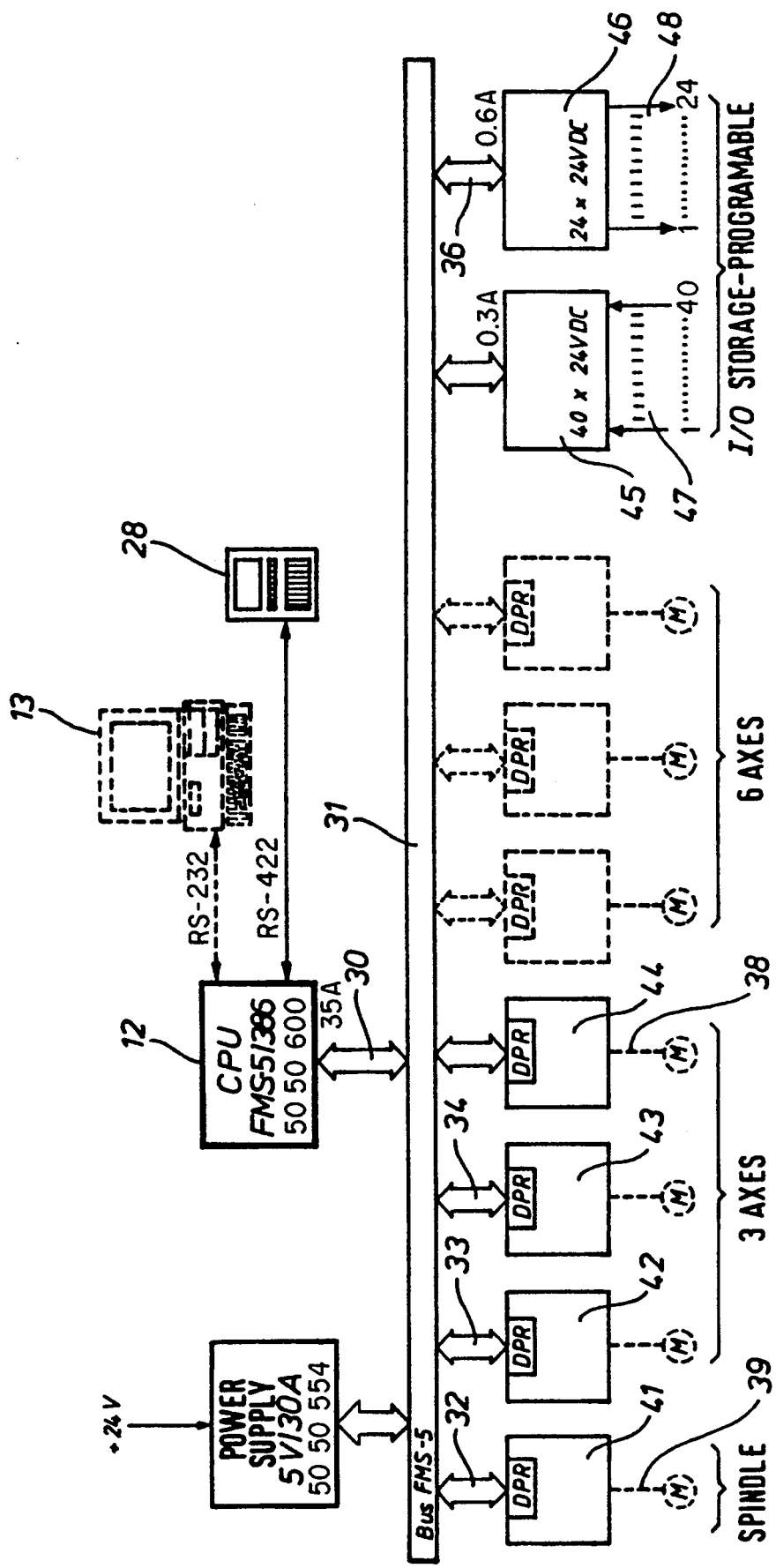
FIG. 4 is an expanded block schematic diagram corresponding to FIG. 1 but illustrating a further embodiment.

The central control unit of the machine tool is referenced 12 in FIGS. 3 and 4. In the simplest case the unit 12 is a transputer or a Risc processor, these being simple and, therefore, low cost devices. The unit 12 is programmed by an external programming computer unit 13 by way of a connecting line 27. Instead of there being a direct connection between the programming unit 13 and the control unit 12, digital data from the programming unit may be fed to the control unit 12 by way of an intermediate input unit. In this case it is sufficient to provide a corresponding read-in unit on the machine tool.

The program status of the central control unit 12 may be arranged to be altered by means of a console 28 by way of a line 29. The console 28 may, for example, consist only of digital displays (light emitting diodes or the like), for displaying the program status of the central control unit 12. Costly screens with corresponding expenditure on software and hardware may accordingly be dispensed with in favour of a simple console 28.

There is stored in the central unit 12 an object program 24 for the control of each axis, so that there is associated with each such axis in a particular unit of time an advance instruction.

The memory of the central control unit 12 may be a simple RAM which does not operate in a higher programming language with the need for a corresponding interpreter, digital data being stored directly in the RAM by way of said line 27.

The control unit 12 acts by way of a multi-bit line 30 on a bus 31, by way of which the data are transferred. A series of axis modules are connected to the bus 31 by way of corresponding lines 32, 33, 34 to 36. It is essential that, for example, by way of the axis module 37 a series of axes can be controlled by way of outlets 38 in which a separate spindle control may also pertain additionally to the axis control.

Here, therefore, the nominal values are given to the axes and the answer-back from the correspondingly controlled axes is effected by way of the corresponding input units 39 by way of their inlets 40. The actual values are given to the control bus 31 via the line 32. These actual values are again passed by way of the line 30 to the central control unit 12 and as a function of the possible deviation between the actual value and the nominal value, the axis module 37 is controlled, in turn, via line 30, bus 31 and line 34, in order to ensure further control of the axes at outlets 38.

A further embodiment of the invention will now be described with reference to FIG. 4.

Although, in this further embodiment, the central control unit 12 comprises a memory region, the control tables described above for each axis or spindle are stored in structural groups 41 to 44 which are connected to the bus 31. The structural groups 41 to 44, therefore, contain additional intelligence cards, according to which the control tables are stored.

Less data exchange by way of the lines 30, the bus 31 and the corresponding lines 32 to 36, is needed because the cards with their associated intelligence reduce the volume of said data exchange.

Since the structural groups 41 to 44 have independent intelligence, the control tables are communicated to the individual structural groups 41 to 44 on loading the program into the machine tool.

In the embodiments according to FIGS. 3 and 4, controls which can still be memory-programmed act on the data bus 31 by way of numerical input and output structural groups 45 and 46, respectively, which are needed in order to control general machine functions, such as, for example, connecting and disconnecting cooling water, the through flow of cooling water, the control of clamping tools and the like. Numerical inlets 47 are programmable by way of the structural group 45. If, for example, in security monitoring the machine tool a door is opened during operation, the machine is stopped.

The structural group 46, has numerical outlets 48 for controlling the cooling water, the clamping tools and like elements of the machine tool. The structural groups 45 and 46 make only one 5VDC/24VDC conversion and respectively place data on, or receive data from, the bus 31, for the central unit 12.

Figure 5:
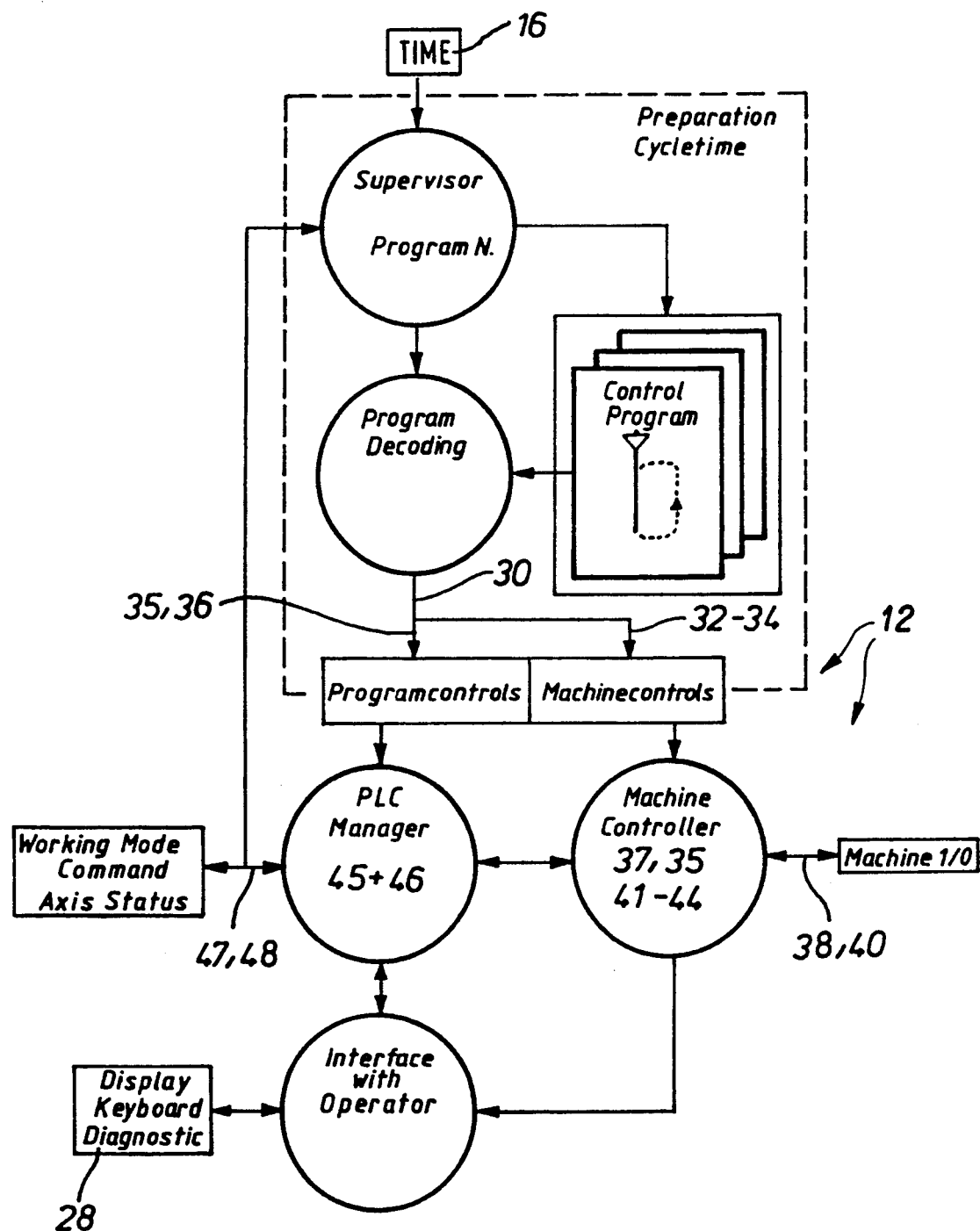
FIG. 5 is a functional circuit diagram of a memory programmable control unit of the control system.

The central control unit 12, may contain a further memory-programmable control which as PLC manager (FIG. 5) monitors and controls the operating sequence of the machine as a whole.

Figure 6:
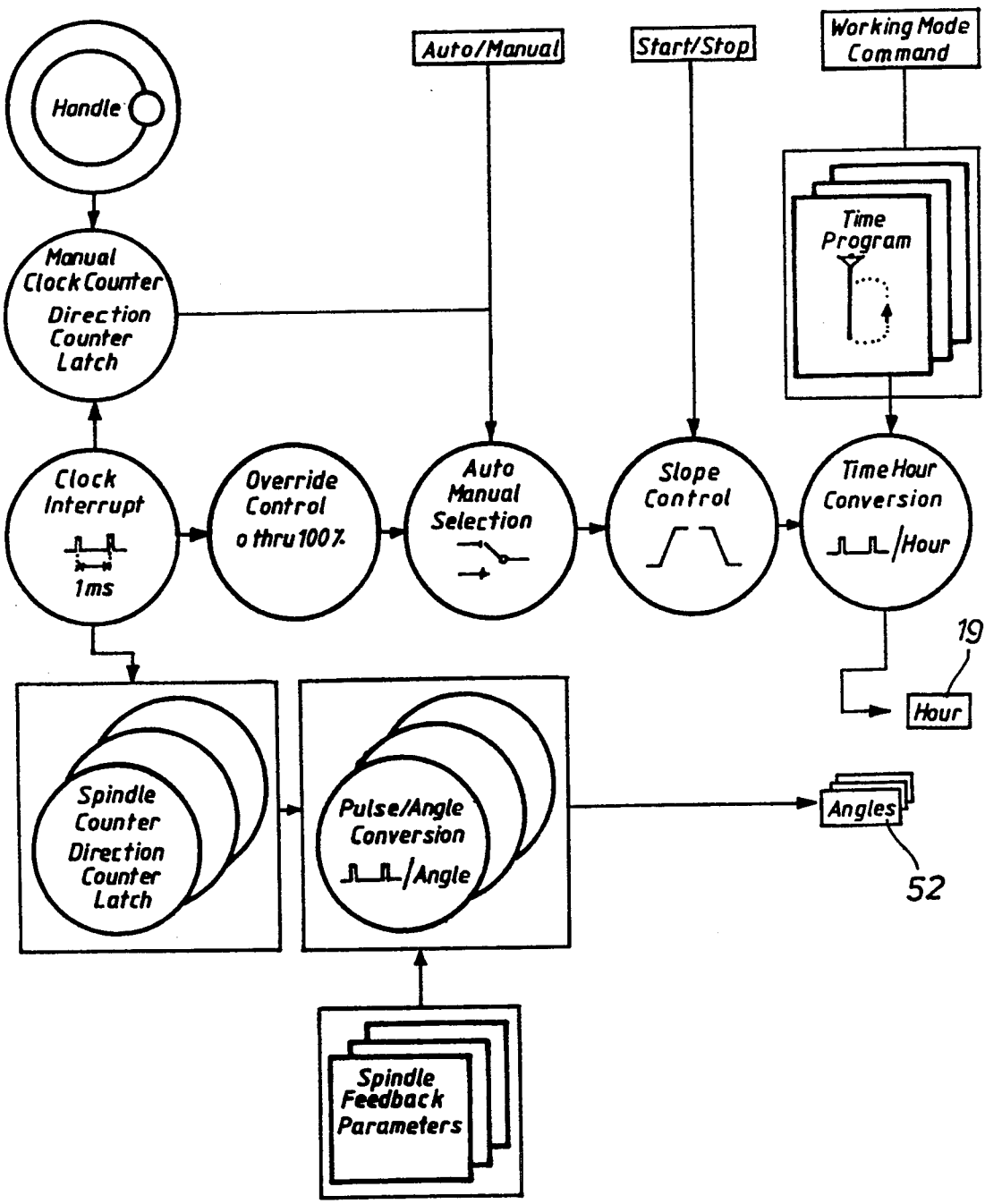
FIG. 6 is a functional circuit diagram of means for generating a central clock cycle of the control system.

According to FIG. 6, the clock signal (machine cycle) is not only generated automatically, but can be modified accordingly by means of a hand wheel having a handle. The machine can thereby be controlled by hand, so as to run faster, slower, forwards or in reverse.

It may be said in summary that there is provided a machine tool, controlled by a cam disc and which is highly productive, the cam disc being present, however, only in the form of software and not as hardware (scannable control part). The production speed and the accuracy of a cam-controlled machine tool is thereby obtained and flexibility being conferred, in that any desired "cam disc" can be produced as software. In other words a cam disc is emulated or imitated in terms of software, a cam disc controlled machine tool being simulated by means of the method described herein.

AS described with reference to FIG. 6 the time cycle of the clock 19 can not only be altered manually by means of said hand wheel, but can also be altered by means of an internal clock signal.

In the automatic mode, the clock 19 runs as a function of a frequency generator, which is variable through an override control switch from 0 to 100%.

Figure 2:
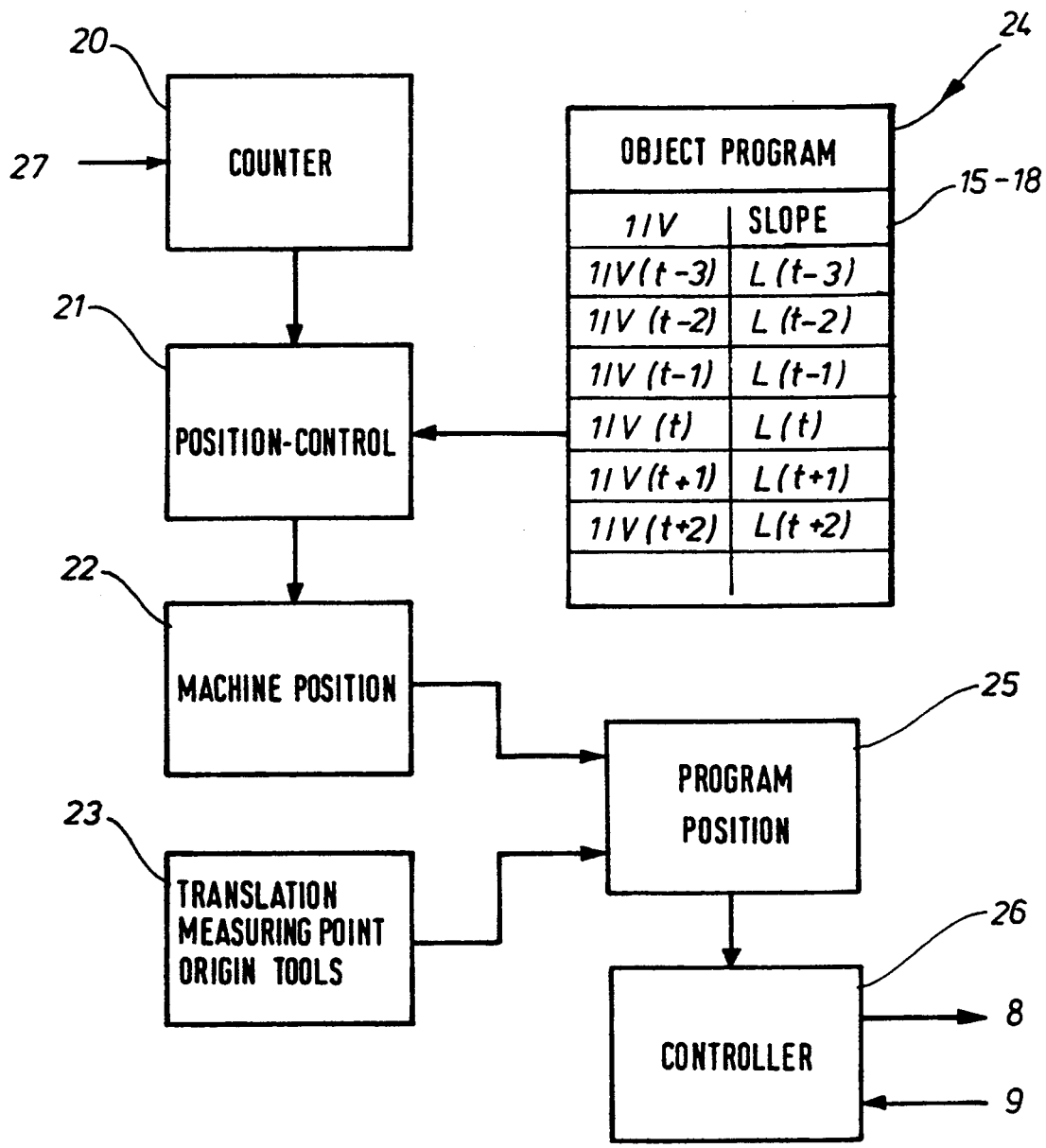
FIG. 2 is a block schematic diagram of means for controlling the axis of a tool, of the machine tool.

In manual operation, the clock 19 is controlled by turning the hand wheel, also, according to the direction of rotation of the handwheel, the time can be made to run "forwards or backwards", as is illustrated in FIG. 2 by the upward and downward counter 20.

Each alteration of the time cycle is monitored by a pulse former, which feeds into a corresponding converter, which generates the central clock cycle of the clock 19.

Analogously, the measurement signals of the spindles, which are expressed in angular degrees, are converted into absolute angle positions as a function of the movement of the respective spindle, and a central angle cycle 52 is formed herefrom.

Figure 7:
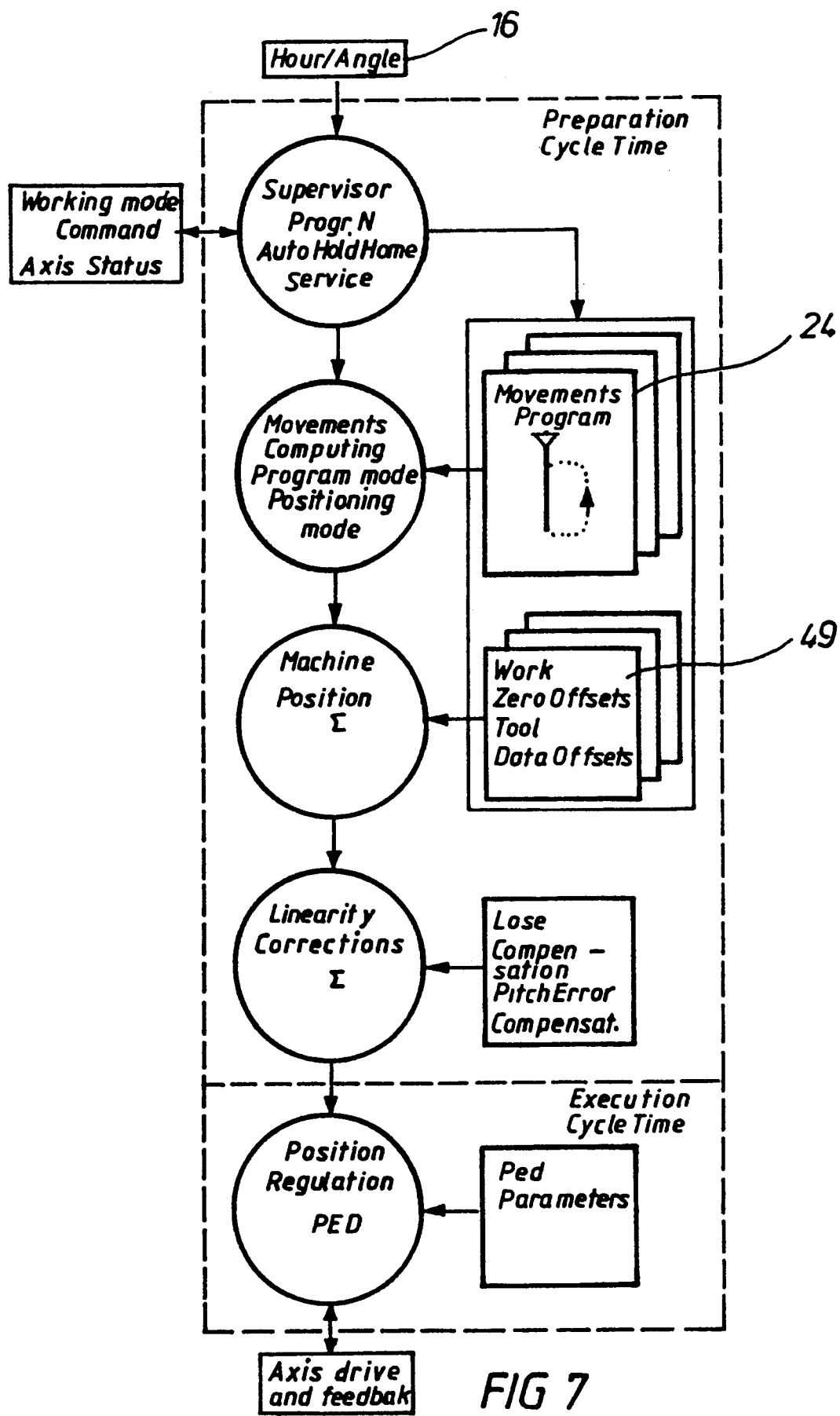
FIG. 7 is a functional circuit diagram of means for generating tool axis control commands in accordance with a tool axis control table.

The generation of an axis control command to control one of the structural groups 37 to 39 or 41 to 44, respectively, will now be explained further, with reference to FIG. 7.

A monitoring unit first monitors the operating status and only then frees the further path when the program circuit provides an axis control command.

The object (movements) program 24, which is calculated according to the method described above, is subjected to a path calculation, to produce, as a result, the machine position to be reached.

In calculating the machine position to be reached, fixed values are additionally taken into account, such as, for example, zero position displacements, tool displacements and the like. As a result of this calculation, a correction signal is calculated, taking into account lag errors and start-up disturbances. A position control signal for a regulator (PED) is generated therefrom, which is in turn influenced by fixed values.

The output signal of the PED regulator then controls the axis drive and receives therefrom the corresponding actual value answer-back signals.

A "machine position" calculator calculates the next, the waiting and the requested machine position, as well as the addition of the next movement to the actual machine position, and also the addition of the zero point shift and the addition of tool length correction, fed by units 49.

A function block (linear corrections) compensates for mechanical errors of the axis, and for play and linearity.

It will now be explained with reference to FIG. 8 how the object program 24, described above with reference to FIG. 2, is calculated in the interplay between the programming unit 13 and the central control unit 12.

The movements of the axes of the individual machine parts are defined in workpiece programs in ISO code. The workpiece programs are partial software programs 51 each for a separate axis and spindle group.

All partial programs 51 are applied to a compiler 14, which also takes into account fixed values supplied by a fixed value memory 49' with respect to particular machine functions and receives other fixed values from a fixed value memory 50 with respect to particular axis parameters.

The compiler 14 processes said partial programs 51 in connection with the values received from the fixed value memories 49' and 50 and calculates the course of the path speed time for each axis separately and writes the values into object files 15 to 18, the object file 15 being associated, for example, with the axis 1, the object file 16 with the axis 2, the object file 17 with the axis 3 and so on.

Figure 8:
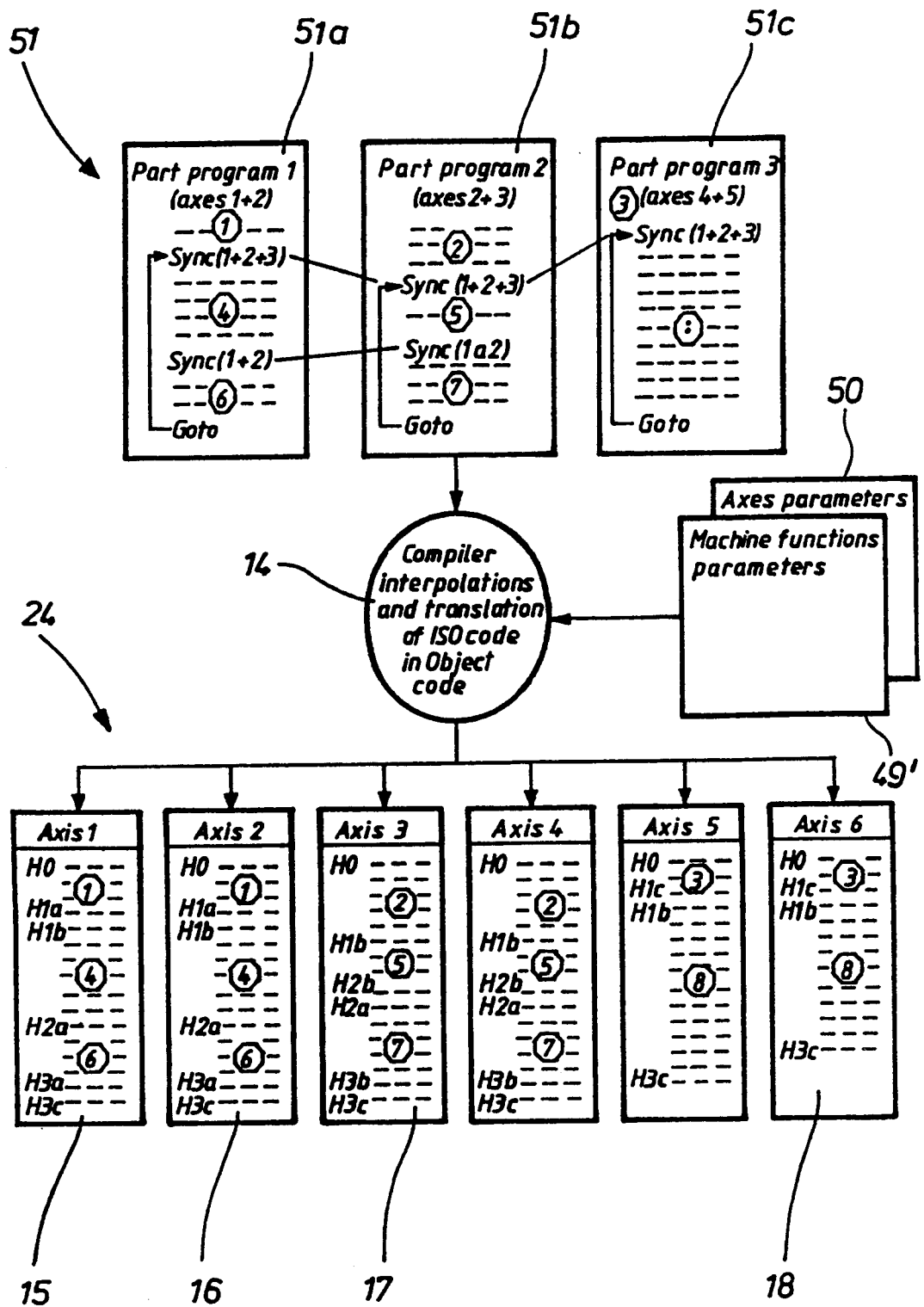
FIG. 8 is a functional diagram illustrating the generation of object programs for each tool axis from a corresponding workpiece program.

According to the example of FIG. 8, the compiler 14 is arranged to process three workpiece programs 51a to 51c, for programming a machine tool having six axes. In order to calculate the path of each axis, the compiler 14 reads the first workpiece program 51a, until it reaches a sequence control point (in this example it encounters a synchronisation between the workpiece programs 51a, 51b, 51c). The compiler 14 calculates the speed values as a function of time for the two programmed axes and writes these values into the object files 15 and 16 for the axes 1 and 2. It will be apparent that the first axis command of this sequence is performed at the time H0 and the last terminates at the time H1a.

Similarly for the second workpiece program 51b with the axes 3 and 4, the first axis command of this sequence is performed at the time H0 and the last terminates at the time H1b.

Similarly for the third workpiece program 51c with the axes 5 and 6, the first axis command of this sequence is performed at the time H0, and the last terminates at the time H1c.

When all of the workpiece programs 51a to 51c are interpreted up to the first synchronisation point, a waiting time must be included for the axes which do not have the longest duration of movement.

In this example, H1b is the longest time. The axes 1, 2, 5 and 6 therefore receive a command with speed zero up to the time H1b.

The compiler 14 continues to operate the workpiece program up to the next sequence control point (in this example synchronisation between the first and second programs). The compiler 14 calculates the speed values as a function of time for the two programmed axes and writes these values following the data present, into the object files of the axes 1 and 2. The last axis command terminates at the time H2a. Similarly for the second workpiece program with the axes 3 and 4, the last axis command terminates at the time H2b. Waiting time for the axes 3 and 4 is programmed by the inclusion of a command with speed zero up to the time H2a.

Further processing of the workpiece program is effected up to the next sequence control point (in this example after a program jump synchronisation between the first, second and third programs). The speed values as a function of time are calculated for the three programs with the six programmed axes and the values following the data present, are written into the object files of the axes, the last axis command of these axis terminating at the time H3c.

As the workpiece program contains a loop the same working is, if possible, produced. The branches are controlled by the clock, which in this example is switched from the time H3c to the time H1c.

The object code, however, must additionally contain waiting times of differing duration. Therefore, the programs of the axes 1, 2, 3 and 4 must contain a waiting time between the time H3a or, H3b, respectively, and the time H3c.

The commands for a movement are defined in the form of segments of constant speed. Each segment contains the starting time, the speed value and the duration of the movement. This definition of the commands for a movement has been selected in the interest of accuracy and in order to reduce the number of blocks needed to form an object program 24. In addition to transient phenomena and non-linear interpolations, an axis always has a constant speed, hence said definition of the commands for a movement.

The scanning of the speed values may be realised in various ways. According to the solution which the present system guarantees, scanning is based on change of position which is the only way of ensuring a satisfactory solution for the reproduction of rapid movements in the case of very low speeds.

The number of blocks, however, which is generated by such a method of scanning, is dependent upon the distance to be travelled. Since the greatest distances are mostly travelled at high speed, the majority of the program will consist of blocks which define such rapid movements and for which a high solution is not needed. The path given by the compiler 14 is, therefore, stored in the form of increments per unit of time and consequently at a constant speed. Such constant position changes per unit of time are stored in a single block with an indication of the number of repetitions.

This type of storage has the disadvantage that the transient phenomena (acceleration, deceleration) are the parts of a path which require the greatest number of blocks, and these blocks are repeated.

In order to prevent an object program from being filled with an impractical amount of redundant information, each transient phenomenon is stored a single time, and the axis control takes this value from a table for each type of transient phenomenon and processes this value further.

It may be said in summary that the machine tool control system described herein has the characteristics and advantages of known mechanical systems using cam controls, whereby machine tools with which rapid working processes can be undertaken can be more economically produced. In contrast with conventional numerical control means, no paths of axes, auxiliary and control functions of the program are calculated in real time. Instead, the necessary axes and spindle controls are calculated before the processing of the workpiece and during the processing of the workpiece. These object files 15 to 18, calculated in the manner of a table, are processed under a central clock cycle of the clock 19. Likewise, the auxiliary and control functions are processed under the same clock cycle by a memory-programmable control unit.

The rapid performance of movement controls is, therefore, achieved and according to the switching of the clock 19, the directions of movement of the axes can also be reversed, without it being needed to recalculate all of the functions (object files). The synchronisation of the various axes and spindles is effected by the central time cycle of the clock 19. Only a minimally equipped operator interface need, therefore, be provided, the simplicity of which corresponds to that of a conventional mechanical cam disc machine, only buttons for starting/stopping the spindles, starting/stopping the program, and a crank (hand wheel) for the sequence control of the program being needed. The operator may adjust the position of each axis by means of an (electronically simulated) micrometer screw (tool offset).

The operator interface may also comprise diagnosis facilities.

The central computer control unit 12 may operate as a host computer by way of a communication interface of a network, to which a number of machine tool control systems as described above are connected.

What is claimed is:

1. A method of operating a numerically controlled machine tool having tools for processing workpieces, the tools having a plurality of axis and spindle movements which are to be calculated independently of each other to control the tools, operation of the machine tool being controlled by further operating, auxiliary and control commands, the method comprising the steps of:
    selecting one of an automatic mode, in which a central clock runs as a function of a frequency generator which is variable within a range of 0 to 100%, and a manual mode, in which the central clock can be made to run faster, slower, forward and in reverse in accordance with movement of a manually operated control element, to generate a timing of the central clock;
    calculating, by means of a programming unit before processing a workpiece rather than in real time, tool axis paths for all of a plurality of tool axis controls;
    storing each tool axis path so calculated in an object file, pertaining to a tool axis to be controlled, by means of a compiler; and
    causing each object file to run in synchronism on the processing of said workpiece, under the timing of the central clock, to control said tools.

2. A method as claimed in claim 1 and further comprising the steps of carrying out said operating, auxiliary and control commands needed for processing the workpiece, to command and monitor the operation of the machine tool, by means of a memory-programmable control, also under the timing of the central clock.

3. A method as claimed in claim 1, wherein movements of each tool axis are calculated as a function of fixed values and contain at least one transient phenomenon for each tool axis, speed and acceleration values being stored as segments each having a constant processing speed and each segment containing a value for the speed, a starting time and a duration of an axis movement.

4. A method as claimed in claim 1, wherein the frequency generator is variably adjustable manually within said range.

5. A method as claimed in claim 1, wherein the step of selecting can be used to manually operate the central clock to count upwards or downwards to reverse the direction of a tool axis.

6. A numerically controlled machine tool comprising:
    a plurality of tools for processing workpieces, the tools having a plurality of axis and spindle movements;
    means for selecting one of an automatic mode, in which a central clock runs as a function of a frequency generator which is variable within a range of 0 to 100%, and a manual mode, in which the central clock can be made to run faster, slower, forward and in reverse in accordance with movement of a manually operated control element, to generate a timing of the central clock;
    means for calculating said movements independently of each other to control the tools;
    means for generating further operating, auxiliary and control commands for controlling the operation of the machine tool; and
    a central unit for separately storing object programs, for each axis and spindle to be controlled, as a function of time and before the processing of a workpiece;
    said central clock processing said object programs in one of the automatic and manual modes.

* * * * *